(12) United States Patent
Nishimura et al.

(10) Patent No.: US 12,735,606 B2
(45) Date of Patent: Sep. 15, 2026

(54) COMPOSITION FOR SELF-SUCTION ADHERING FOAM SHEET AND SELF-SUCTION ADHERING FOAM LAMINATE SHEET

(71) Applicant: ZEON CORPORATION, Tokyo (JP)

(72) Inventors: Shunsuke Nishimura, Tokyo (JP); Shinsuke Ashida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 265 days.

(21) Appl. No.: 18/256,299

(22) PCT Filed: Dec. 21, 2021

(86) PCT No.: PCT/JP2021/047413

§ 371 (c)(1),
(2) Date: Jun. 7, 2023

(87) PCT Pub. No.: WO2022/138669

PCT Pub. Date: Jun. 30, 2022

(65) Prior Publication Data

US 2024/0034911 A1 Feb. 1, 2024

(30) Foreign Application Priority Data

Dec. 25, 2020 (JP) ................................ 2020-217923

(51) Int. Cl.

| | |
|---|---|
| ***C09J 5/08*** | (2006.01) |
| ***B32B 7/12*** | (2006.01) |
| ***B32B 27/30*** | (2006.01) |
| ***C09J 133/10*** | (2006.01) |

(52) U.S. Cl.

CPC .................. *C09J 5/08* (2013.01); *B32B 7/12* (2013.01); *B32B 27/308* (2013.01); *C09J 133/10* (2013.01); *B32B 2266/0242* (2013.01); *B32B 2266/14* (2016.11)

(58) Field of Classification Search

None

See application file for complete search history.

(56) References Cited

U.S. PATENT DOCUMENTS

| | | | | |
|---|---|---|---|---|
| 11,072,729 | B2 | 7/2021 | Tanaka et al. | |
| 11,427,691 | B2 | 8/2022 | Ashida et al. | |
| 2016/0304680 | A1* | 10/2016 | Doi ........................ | C08J 9/0061 |

(Continued)

FOREIGN PATENT DOCUMENTS

| | | | |
|---|---|---|---|
| CN | 109790317 | A | 5/2019 |
| JP | H05311024 | A * | 11/1993 |

(Continued)

OTHER PUBLICATIONS

Kato, K., Foam Sheet, Feb. 15, 2018, machine translation of JP2018-024840 (Year: 2018).*

(Continued)

*Primary Examiner* — Chinessa T. Golden

(74) *Attorney, Agent, or Firm* — KENJA IP LAW PC

(57) ABSTRACT

Provided is a composition for a self-suction adhering foam sheet that can be used to obtain a self-suction adhering foam laminate sheet having little decline of self-adhesive strength over time. The composition for a self-suction adhering foam sheet contains a polymer, an oxazoline cross-linker, and a wax agent.

6 Claims, 2 Drawing Sheets

(56) References Cited

U.S. PATENT DOCUMENTS

2021/0178734 A1 6/2021 Kato et al.
2023/0078720 A1 3/2023 Nishimura et al.

FOREIGN PATENT DOCUMENTS

JP H10158619 A * 6/1998
JP 2018024840 A * 2/2018 ........... B32B 27/065
JP 2019038997 A * 3/2019 ............. B32B 27/00
WO 2016147679 A1 9/2016
WO 2018151274 A1 8/2018
WO 2021166861 A1 8/2021

OTHER PUBLICATIONS

Yamanari, Y., Resin Sheet, Mar. 14, 2019, machine translation of JP2019-038997 (Year: 2019).*
Carnauba wax. Wikipedia.*
Akasaka, K., Self Adhesive Composition, Jun. 16, 1998, machine translation of JP10-158619 (Year: 1998).*
Yonekawa, Y., Nov. 22, 1993, machine translation of JP05-311024 (Year: 1993).*
Oct. 29, 2024, the Extended European Search Report issued by the European Patent Office in the corresponding European Patent Application No. 21910809.9.
Mar. 8, 2022, International Search Report issued in the International Patent Application No. PCT/JP2021/047413.
Jun. 13, 2023, International Preliminary Report on Patentability issued in the International Patent Application No. PCT/JP2021/047413.

* cited by examiner

COMPOSITION FOR SELF-SUCTION ADHERING FOAM SHEET AND SELF-SUCTION ADHERING FOAM LAMINATE SHEET

TECHNICAL FIELD

The present disclosure relates to a composition for a self-suction adhering foam sheet and to a self-suction adhering foam laminate sheet.

BACKGROUND

In recent years, sheet-shaped members that are formed of foam materials including numerous fine pores and that display self-suction adhesion (i.e., self-suction adhering foam sheets (hereinafter, also referred to simply as "foam sheets")) have been used as adhesive sheets that are affixed to smooth adherends such as window glass for use. The mode of adhesion of a self-suction adhering foam sheet is through suction adhesion to an adherend using the fine pores thereof rather than through gluing. Consequently, self-suction adhering foam sheets are easy to reaffix compared to conventional adhesive sheets that utilize gluing, and are suitable for use in applications such as wallpaper, posters, and stickers, for example. In these applications, a self-suction adhering foam sheet is typically used in the form of a self-suction adhering foam laminate sheet (hereinafter, also referred to simply as a "laminate sheet") in which the self-suction adhering foam sheet is stacked with a substrate. Decorating the surface at the substrate-side of the self-suction adhering foam laminate sheet by printing or the like enables advantageous use of the self-suction adhering foam laminate sheet in applications such as described above.

Improvements have been made to compositions used in production of constituent foam sheets of self-suction adhering foam laminate sheets in order to increase performance of such laminate sheets. (Note that hereinafter, such a composition may also be referred to as a "composition for a self-suction adhering foam sheet" or simply as a "composition for a foam sheet".)

For example, Patent Literature (PTL) 1 proposes a composition for a foam sheet that contains a polymer having specific properties and a cross-linker. Through a laminate sheet that includes a foam sheet formed from the composition for a foam sheet proposed in PTL 1, it is possible to inhibit the formation of resin residue on glass serving as an adherend even after weathering.

CITATION LIST

Patent Literature

PTL 1: WO2018/151274A1

SUMMARY

Technical Problem

It is desirable for a laminate sheet to have an attribute of easily allowing removal of air pockets remaining between the sheet and an adherend when a surface at the foam sheet-side of the laminate sheet is suction adhered to the adherend (i.e., it is desirable for a laminate sheet to have excellent air releasability). In particular, it is desirable for a laminate sheet to maintain excellent air releasability even after heating and pressing (i.e., have excellent post-heating and pressing air releasability) because there are instances in which a laminate sheet is exposed to a high-temperature pressurized environment during transportation or the like.

Through studies conducted by the inventors, the inventors found that by forming a foam sheet using a composition for a foam sheet that contains a polymer, a cross-linker, and a wax agent, it is possible to cause a laminate sheet including this foam sheet to display excellent air releasability even after heating and pressing.

However, further studies conducted by the inventors revealed that there was room for improvement of a laminate sheet including a foam sheet formed using the aforementioned composition for a foam sheet in terms of reducing the extent to which self-adhesive strength (close adhesion strength to an adherend) declines over time.

Accordingly, an object of the present disclosure is to provide a self-suction adhering foam laminate sheet having little decline of self-adhesive strength over time and a composition for a self-suction adhering foam sheet that can be used to obtain this self-suction adhering foam laminate sheet.

Solution to Problem

The inventors conducted diligent studies with the aim of solving the problem set forth above. The inventors discovered that by forming a foam sheet using a composition for a foam sheet that contains a polymer, an oxazoline cross-linker, and a wax agent, it is possible to reduce the extent to which self-adhesive strength of a laminate sheet including the foam sheet declines over time, and, in this manner, completed the present disclosure.

Specifically, the present disclosure aims to advantageously solve the problem set forth above, and a presently disclosed composition for a self-suction adhering foam sheet comprises a polymer, an oxazoline cross-linker, and a wax agent. By forming a foam sheet using a composition for a foam sheet that contains a polymer, an oxazoline cross-linker, and a wax agent in this manner, it is possible to reduce the extent to which self-adhesive strength of a laminate sheet including the foam sheet declines over time.

In the presently disclosed composition for a self-suction adhering foam sheet, the polymer preferably includes a (meth)acrylate monomer unit in a proportion of not less than 60 mass % and not more than 99 mass %. By using a composition for a foam sheet that contains a polymer including a (meth)acrylate monomer unit in the proportion set forth above, it is possible to obtain a laminate sheet that maintains good self-adhesive strength while also inhibiting formation of resin residue on an adherend.

Note that when a polymer is said to "include a monomer unit" in the present disclosure, this means that "a polymer obtained using that monomer includes a repeating unit derived from the monomer". Also note that in the present disclosure, "(meth)acrylate" is used to indicate "acrylate" and/or "methacrylate".

In the presently disclosed composition for a self-suction adhering foam sheet, an amount of the oxazoline cross-linker is preferably not less than 0.5 parts by mass and not more than 30 parts by mass per 100 parts by mass of the polymer. By using a composition for a foam sheet in which the amount of the oxazoline cross-linker per 100 parts by mass of the polymer is within the range set forth above, it is possible to maintain good self-adhesive strength of a laminate sheet while also further reducing the extent to which self-adhesive strength declines over time.

In the presently disclosed composition for a self-suction adhering foam sheet, the wax agent preferably includes a fatty acid ester including a fatty acid moiety having a carbon number of not less than 16 and not more than 34. By using a fatty acid ester including a fatty acid moiety (structure derived from a fatty acid in the fatty acid ester) that has a carbon number within the range set forth above as the wax agent, it is possible to increase post-heating and pressing air releasability of a laminate sheet.

In the presently disclosed composition for a self-suction adhering foam sheet, an amount of the wax agent is preferably not less than 0.5 parts by mass and not more than 10 parts by mass per 100 parts by mass of the polymer. By using a composition for a foam sheet in which the amount of the wax agent per 100 parts by mass of the polymer is within the range set forth above, it is possible to increase post-heating and pressing air releasability of a laminate sheet.

Moreover, the present disclosure aims to advantageously solve the problem set forth above, and a presently disclosed self-suction adhering foam laminate sheet comprises: a substrate; and a self-suction adhering foam sheet formed using any one of the compositions for a self-suction adhering foam sheet set forth above, wherein the substrate is a paper substrate other than a synthetic paper substrate, a plastic substrate, a fibrous substrate, a metal substrate, or a glass substrate. In the case of a laminate sheet that includes a foam sheet formed using the composition for a foam sheet set forth above on a paper substrate other than a synthetic paper substrate, a plastic substrate, a fibrous substrate, a metal substrate, or a glass substrate in this manner, the laminate sheet has little decline of self-adhesive strength over time.

The term "synthetic paper" as used in the present disclosure refers to a product obtained by forming a film of a resin composition that contains a thermoplastic resin and a filler.

Advantageous Effect

According to the present disclosure, it is possible to provide a self-suction adhering foam laminate sheet having little decline of self-adhesive strength over time and a composition for a self-suction adhering foam sheet that can be used to obtain this self-suction adhering foam laminate sheet.

DETAILED DESCRIPTION

Figure 1:
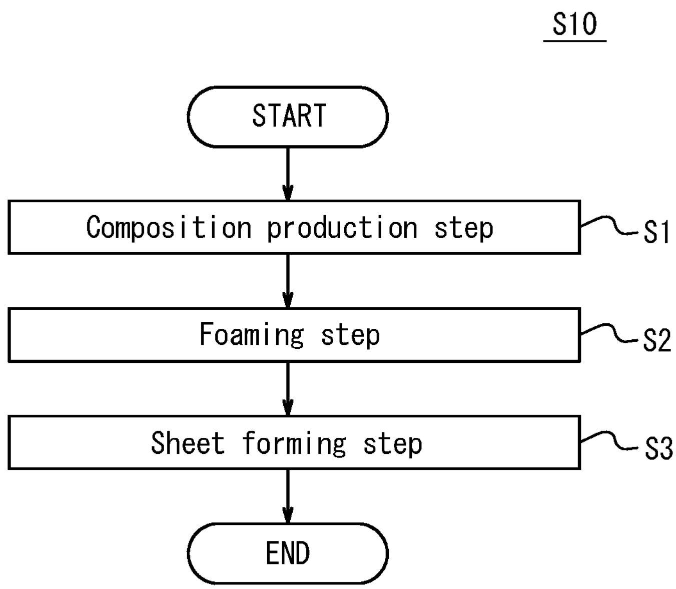
FIG. 1 is a flowchart for describing one example of a method of producing a self-suction adhering foam laminate sheet according to the present disclosure.

The following provides a detailed description of embodiments of the present disclosure.

The presently disclosed composition for a self-suction adhering foam sheet can suitably be used to obtain a self-suction adhering foam sheet that is a constituent element of the presently disclosed self-suction adhering foam laminate sheet. Moreover, the presently disclosed self-suction adhering foam laminate sheet includes a self-suction adhering foam sheet that is formed using the presently disclosed composition for a self-suction adhering foam sheet.

(Composition for Self-Suction Adhering Foam Sheet)

The presently disclosed composition for a foam sheet contains a polymer, an oxazoline cross-linker, and a wax agent, and optionally further contains a solvent and other additives.

By using the presently disclosed composition for a foam sheet to form a foam sheet on a paper substrate other than a synthetic paper substrate, a plastic substrate, a fibrous substrate, a metal substrate, or a glass substrate, it is possible to obtain a laminate sheet having little decline of self-adhesive strength over time. Moreover, a laminate sheet including a foam sheet that is formed using the presently disclosed composition for a foam sheet can display good self-adhesive strength both initially (i.e., straight after production) and after time elapses as a result of having little decline of self-adhesive strength over time.

Furthermore, a laminate sheet including a foam sheet that is formed using the presently disclosed composition for a foam sheet also has excellent post-heating and pressing air releasability.

<Polymer>

The polymer used in the presently disclosed composition for a foam sheet forms a resin matrix in a foam sheet that is obtained through foaming and cross-linking of the composition for a foam sheet. Although no specific limitations are placed on the polymer, the polymer can, for example, include one or more monomer units selected from the group consisting of a (meth)acrylate monomer unit, an unsaturated carboxylic acid monomer unit, a vinyl cyanide monomer unit, and an alkenyl aromatic monomer unit. Moreover, the polymer may include monomer units other than the (meth) acrylate monomer unit, the unsaturated carboxylic acid monomer unit, the vinyl cyanide monomer unit, and the alkenyl aromatic monomer unit (hereinafter, referred to as "other monomer units").

<<(Meth)Acrylate Monomer Unit>>

The (meth)acrylate monomer unit is a repeating unit that is derived from a (meth)acrylate monomer. The inclusion of a (meth)acrylate monomer unit in the polymer can impart flexibility to an obtained foam sheet and makes it possible to obtain a laminate sheet having good self-adhesive strength.

Examples of (meth)acrylate monomers include, but are not specifically limited to, (meth)acrylic acid alkyl ester monomers such as methyl (meth)acrylate, ethyl (meth)acrylate, n-propyl (meth)acrylate, n-butyl (meth)acrylate, sec-butyl (meth)acrylate, n-heptyl (meth)acrylate, n-hexyl (meth)acrylate, n-octyl (meth)acrylate, 2-ethylhexyl (meth) acrylate, and n-dodecyl (meth)acrylate; and (meth)acrylic acid alkoxyalkyl ester monomers such as 2-methoxyethyl (meth)acrylate, 3-methoxypropyl (meth)acrylate, 3-methoxybutyl (meth)acrylate, and ethoxymethyl (meth) acrylate.

Note that one (meth)acrylate monomer may be used individually, or two or more (meth)acrylate monomers may be used together. Also note that in the present disclosure, "(meth)acryl" is used to indicate "acryl" and/or "methacryl".

The (meth)acrylate monomer is preferably a (meth) acrylic acid alkyl ester monomer from a viewpoint of further increasing flexibility of a foam sheet and even better ensuring self-adhesive strength of a laminate sheet, and is more preferably a (meth)acrylic acid alkyl ester monomer in which the carbon number of the alkyl group (bonded to a non-carbonyl oxygen atom) is not less than 1 and not more than 14 (hereinafter, also referred to simply as a "C1-14 (meth)acrylic acid alkyl ester monomer").

Examples of C1-14 (meth)acrylic acid alkyl ester monomers include methyl acrylate, ethyl acrylate, n-propyl acrylate, n-butyl acrylate, sec-butyl acrylate, n-heptyl acrylate, n-hexyl acrylate, n-octyl acrylate, 2-ethylhexyl acrylate, methyl methacrylate, ethyl methacrylate, n-propyl methacrylate, n-butyl methacrylate, n-octyl methacrylate, and n-dodecyl methacrylate. Of these C1-14 (meth)acrylic acid alkyl ester monomers, n-butyl acrylate, ethyl acrylate, and 2-ethylhexyl acrylate are preferable from a viewpoint of self-adhesive strength and cost.

The proportion constituted by the (meth)acrylate monomer unit in the polymer when all repeating units (all monomer units) included in the polymer are taken to be 100 mass % is preferably 60 mass % or more, more preferably 70 mass % or more, even more preferably 80 mass % or more, and particularly preferably 85 mass % or more, and is preferably 99 mass % or less, more preferably 95 mass % or less, even more preferably 92 mass % or less, and particularly preferably 89 mass % or less. When the proportion constituted by the (meth)acrylate monomer unit in the polymer is 60 mass % or more, self-adhesive strength of a laminate sheet can be sufficiently ensured. On the other hand, when the proportion constituted by the (meth)acrylate monomer unit in the polymer is 99 mass % or less, self-adhesive strength of a laminate sheet does not become excessively high. Consequently, formation of resin residue of the laminate sheet on an adherend can be inhibited.

<<Unsaturated Carboxylic Acid Monomer Unit>>

The unsaturated carboxylic acid monomer unit is a repeating unit that is derived from an unsaturated carboxylic acid monomer.

Specific examples of unsaturated carboxylic acid monomers include α,β-ethylenically unsaturated monocarboxylic acids such as acrylic acid, methacrylic acid, and crotonic acid; α,β-ethylenically unsaturated polybasic carboxylic acids such as itaconic acid, maleic acid, and fumaric acid; and α,β-ethylenically unsaturated polybasic carboxylic acid partial esters such as monomethyl itaconate, monobutyl maleate, and monopropyl fumarate. Monomers including a group from which a carboxy group can be derived by hydrolysis or the like, such as maleic anhydride and itaconic anhydride, can also be used. Of these unsaturated carboxylic acid monomers, itaconic acid, acrylic acid, and methacrylic acid are preferable from a viewpoint of reactivity with the subsequently described cross-linker, stability of a polymer latex, and cost, with acrylic acid being more preferable.

Note that one unsaturated carboxylic acid monomer may be used individually, or two or more unsaturated carboxylic acid monomers may be used together.

The proportion constituted by the unsaturated carboxylic acid monomer unit in the polymer when all repeating units (all monomer units) included in the polymer are taken to be 100 mass % is preferably 0.1 mass % or more, more preferably 0.5 mass % or more, and even more preferably 1 mass % or more, and is preferably 10 mass % or less, more preferably 5 mass % or less, and even more preferably 2.5 mass % or less. When the proportion constituted by the unsaturated carboxylic acid monomer unit in the polymer is 0.1 mass % or more, a cross-linking reaction can be caused to sufficiently proceed through the subsequently described cross-linker. As a result, sufficient strength can be imparted to an obtained foam sheet while also inhibiting formation of resin residue of a laminate sheet on an adherend. On the other hand, when the proportion constituted by the unsaturated carboxylic acid monomer unit in the polymer is 10 mass % or less, it is easier to maintain the viscosity of a polymerization system within an appropriate range during polymerization, and self-adhesive strength of a laminate sheet is not lost due to excessive progression of cross-linking of the polymer.

<<Vinyl Cyanide Monomer Unit>>

The vinyl cyanide monomer unit is a repeating unit that is derived from a vinyl cyanide monomer. Specific examples of vinyl cyanide monomers include α,β-ethylenically unsaturated nitrile monomers. No specific limitations are placed on α,β-ethylenically unsaturated nitrile monomers that can be used other than being an α,β-ethylenically unsaturated compound that includes a nitrile group. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these vinyl cyanide monomers, acrylonitrile is preferable from a viewpoint of improving cohesion of the composition for a foam sheet and increasing fracture strength of a foam sheet.

Note that one vinyl cyanide monomer may be used individually, or two or more vinyl cyanide monomers may be used together.

The proportion constituted by the vinyl cyanide monomer unit in the polymer when all repeating units (all monomer units) included in the polymer are taken to be 100 mass % is preferably 1 mass % or more, more preferably 3 mass % or more, even more preferably 5 mass % or more, and particularly preferably 8 mass % or more, and is preferably 30 mass % or less, more preferably 20 mass % or less, and even more preferably 15 mass % or less. When the proportion constituted by the vinyl cyanide monomer unit in the polymer is 1 mass % or more, sufficient strength can be imparted to an obtained foam sheet while also inhibiting formation of resin residue of a laminate sheet on an adherend. On the other hand, when the proportion constituted by the vinyl cyanide monomer unit in the polymer is 30 mass % or less, flexibility of an obtained foam sheet can be sufficiently ensured, and a laminate sheet having good self-adhesive strength can be obtained.

<<Alkenyl Aromatic Monomer Unit>>

The alkenyl aromatic monomer unit is a repeating unit that is derived from an alkenyl aromatic monomer. Specific examples of alkenyl aromatic monomers include styrene, α-methylstyrene, α-chlorostyrene, vinyltoluene, and divinylbenzene. Of these alkenyl aromatic monomers, styrene is preferable from a viewpoint of polymerizability and cost.

Note that one alkenyl aromatic monomer may be used individually, or two or more alkenyl aromatic monomers may be used together.

The proportion constituted by the alkenyl aromatic monomer unit in the polymer when all repeating units (all monomer units) included in the polymer are taken to be 100 mass % is preferably 0.5 mass % or more, more preferably 1 mass % or more, even more preferably 1.5 mass % or more, and particularly preferably 2 mass % or more, and is preferably 20 mass % or less, more preferably 10 mass % or less, and even more preferably 5 mass % or less. When the proportion constituted by the alkenyl aromatic monomer unit in the polymer is 0.5 mass % or more, infiltration of water into a foam sheet can be prevented based on hydrophobicity of the alkenyl aromatic monomer unit, and water resistance of a laminate sheet can be increased. On the other hand, when the proportion constituted by the alkenyl aromatic monomer unit in the polymer is 20 mass % or less, flexibility of an obtained foam sheet can be sufficiently ensured, and a laminate sheet having good self-adhesive strength can be obtained.

<<Other Monomer Units>>

The other monomer units are repeating units that are derived from other monomers that are copolymerizable with the foregoing monomers.

Examples of other monomers include conjugated diene monomers, α,β-ethylenically unsaturated polybasic carboxylic acid full ester monomers, carboxylic acid unsaturated alcohol ester monomers, olefin monomers, and monomers including other functional groups. One of these monomers may be used individually, or two or more of these monomers may be used together. Specific examples of such other monomers that can be used include those described in WO2018/151274A1, for example, but are not specifically limited thereto.

Note that the polymer preferably does not include an N-methylol group from a viewpoint of sufficiently inhibiting production of formaldehyde during foaming and curing of the composition for a foam sheet. More specifically, the polymer preferably does not include a monomer unit that includes an N-methylol group.

Examples of monomers that include an N-methylol group include N-methylolacrylamide and N-methylolmethacrylamide.

<<Properties>>

[Glass-Transition Temperature]

The glass-transition temperature of the polymer is preferably −10° C. or lower, more preferably −13° C. or lower, even more preferably −17° C. or lower, further preferably −20° C. or lower, and even further preferably −31° C. or lower. When the glass-transition temperature of the polymer is −10° C. or lower, self-adhesive strength of a laminate sheet can be sufficiently ensured while also enabling good close adherence of the laminate sheet to an adherend and thereby preventing infiltration of moisture between layers of the adherend and the laminate sheet. Consequently, water resistance of a laminate sheet can be increased.

Although no specific limitations are placed on the lower limit for the glass-transition temperature of the polymer, the glass-transition temperature is preferably −40° C. or higher from a viewpoint of sufficiently inhibiting formation of resin residue of a laminate sheet on an adherend.

Note that the glass-transition temperature of a polymer can be measured using a method described in the EXAMPLES section of the present specification.

[Gel Fraction]

The gel fraction of the polymer is preferably 95 mass % or less, more preferably 93 mass % or less, and even more preferably 80 mass % or less. When the gel fraction is 95 mass % or less, it is possible to produce a foam sheet and a laminate sheet having appropriate self-adhesive strength and excellent smoothness. Although no specific limitations are placed on the lower limit for the gel fraction of the polymer, the gel fraction can be set as 50 mass % or more, or can be set as 70 mass % or more, for example.

Note that the gel fraction of a polymer can be measured using a method described in the EXAMPLES section of the present specification.

<<Production Method of Polymer>>

The polymerization method used to obtain the polymer is not specifically limited and may be any of solution polymerization, emulsion polymerization, suspension polymerization, and bulk polymerization, or may be a method other than these methods. No specific limitations are placed on the type and amount of a polymerization initiator, emulsifier, dispersant, and so forth that are used in polymerization. Moreover, no specific limitations are placed on the addition method of the monomers, polymerization initiator, emulsifier, dispersant, and so forth in polymerization. Furthermore, no limitations are placed on the polymerization temperature, pressure, stirring conditions, and so forth.

Note that although the polymer can be used in a solid form, the use of the polymer in the form of a latex containing the polymer (polymer latex), such as a latex obtained by emulsion polymerization or a latex obtained through subsequent emulsification of the polymer, facilitates operation in mixing with the cross-linker, wax agent, and so forth, and is also convenient for causing foaming of the obtained composition for a foam sheet.

In a case in which the polymer is used in the form of a polymer latex in production of the composition for a foam sheet as previously mentioned, the solid content concentration of the polymer latex is preferably 40 mass % or more, more preferably 45 mass % or more, even more preferably 50 mass % or more, and particularly preferably 52 mass % or more, and is preferably 70 mass % or less, and more preferably 58 mass % or less from viewpoints such as maintaining density of an obtained foam sheet.

<Oxazoline Cross-Linker>

The presently disclosed composition for a foam sheet contains an oxazoline cross-linker. An oxazoline group of the oxazoline cross-linker forms a cross-linked structure in or between molecules of the polymer by reacting with a functional group or the like (for example, a carboxy group originating from the unsaturated carboxylic acid monomer unit) in the polymer. By using the presently disclosed composition for a foam sheet that contains an oxazoline cross-linker as a cross-linker, it is possible to form a foam sheet that has excellent self-adhesive strength and low tendency for self-adhesive strength to decline over time. Consequently, it is possible to reduce the extent to which self-adhesive strength of a laminate sheet including the foam sheet declines over time.

No specific limitations are placed on the oxazoline cross-linker so long as it includes at least one oxazoline group in one molecule thereof and can form a cross-linked structure with the previously described polymer. Note that the oxazoline cross-linker is a different component from the previously described polymer.

From a viewpoint of further reducing the extent to which self-adhesive strength of a laminate sheet declines over time, it is preferable to use a polymer obtained through polymerization of a monomer that includes an oxazoline group (oxazoline group-containing monomer) as the oxazoline cross-linker (i.e., it is preferable to use an oxazoline group-containing polymer). The oxazoline group-containing polymer may be a copolymer of an oxazoline group-containing monomer and a monomer other than an oxazoline group-containing monomer.

The glass-transition temperature of the oxazoline group-containing polymer may be 20° C. or higher, 30° C. or higher, 40° C. or higher, or 50° C. or higher, for example, and may be 200° C. or lower, 150° C. or lower, or 100° C. or lower, for example.

The oxazoline cross-linker may be synthesized by a known technique or may be a commercially available product. Examples of commercially available products of oxazoline cross-linkers include EPOCROS WS-300, EPOCROS WS-500, and EPOCROS WS-700 produced by Nippon Shokubai Co., Ltd.

The amount of the oxazoline cross-linker in the composition for a foam sheet is preferably 0.5 parts by mass or more, more preferably 1 part by mass or more, even more preferably 3 parts by mass or more, further preferably 6 parts by mass or more, and even further preferably parts by mass or more per 100 parts by mass of the previously described polymer, and is preferably 30 parts by mass or less, more preferably 20 parts by mass or less, and even more preferably 15 parts by mass or less per 100 parts by mass of the previously described polymer. When the amount of the oxazoline cross-linker is 0.5 parts by mass or more per 100 parts by mass of the polymer, the extent to which self-adhesive strength of a laminate sheet including a formed foam sheet declines over time can be further reduced. On the other hand, when the amount of the oxazoline cross-linker is 30 parts by mass or less per 100 parts by mass of the polymer, excessive progression of cross-linking of the polymer can be inhibited, and self-adhesive strength of a laminate sheet including a formed foam sheet can be sufficiently ensured.

<Wax Agent>

The wax agent contained in the presently disclosed composition for a foam sheet is not specifically limited so long at it includes a fatty acid ester (particularly an ester of a higher fatty acid and a higher alcohol). The content of the fatty acid ester in the wax agent when the overall wax agent is taken to be 100 mass % is preferably more than 50 mass % and not more than 100 mass % (i.e., the fatty acid ester is preferably the principal component), more preferably not less than 70 mass % and not more than 100 mass %, even more preferably not less than 80 mass % and not more than 100 mass %, and particularly preferably not less than 90 mass % and not more than 100 mass %. Note that the wax agent may include one type of fatty acid ester or may include two or more types of fatty acid esters.

The wax agent functions as a light release agent in a foam sheet formed using the composition for a foam sheet. Moreover, by forming a foam sheet through foaming and curing of a composition for a foam sheet in which a wax agent is compounded with the previously described polymer, it is possible to provide a laminate sheet including the foam sheet with excellent post-heating and pressing air releasability. This is presumed to be because the light releasability imparts better resilience even when the insides of open cells in the foam sheet are pressed together.

The wax agent may be a natural wax, a synthetic wax, or a mixture thereof, but is preferably a natural wax.

The natural wax is not specifically limited so long as it includes a fatty acid ester of natural origin and specific examples thereof include natural waxes of plant origin such as rice bran wax, sugarcane wax, carnauba wax, candelilla wax, jojoba oil, Japan wax, and horseradish tree seed oil (moringa oil); natural waxes of animal origin such as beeswax, spermaceti, and wool fat; and natural waxes of mineral origin such as montan wax, ozokerite, and ceresin. Of these waxes, horseradish tree seed oil is preferable from a viewpoint of further increasing post-heating and pressing air releasability of a laminate sheet. Each of these natural waxes may be purified from natural material by a known technique or may be a commercially available product. Examples of commercially available products of natural waxes include Purified Moringa Oil produced by NITTO-BUSSAN Corporation Ltd.

Note that one wax agent may be used individually, or two or more wax agents may be used together.

A fatty acid moiety of the fatty acid ester that is included in the wax agent preferably has a carbon number of 16 or more, and more preferably 18 or more, and preferably has a carbon number of 34 or less, and more preferably 30 or more. When the carbon number of the fatty acid moiety of the fatty acid ester is within any of the ranges set forth above, post-heating and pressing air releasability of a laminate sheet can be further increased. Specific examples of fatty acids having a carbon number of not less than 16 and not more than 34 include saturated fatty acids such as stearic acid (C18), arachidic acid (C20), and behenic acid (C22); and unsaturated fatty acids such as oleic acid (C18), linoleic acid (C18), and linolenic acid (C18).

Note that one of these fatty acids may be used individually, or two or more of these fatty acids may be used together.

An alcohol moiety of the fatty acid ester that is included in the wax agent preferably has a carbon number of 30 or more, and preferably has a carbon number of 34 or less. When the carbon number of the alcohol moiety of the fatty acid ester is within the range set forth above, post-heating and pressing air releasability of a laminate sheet can be further increased. Specific examples of alcohols having a carbon number of not less than 30 and not more than 34 include myricyl alcohol (C30), melissyl alcohol (C31), lacceryl alcohol (C32), ceromelissyl alcohol (C33), and tetratriacontanol (C34).

Note that one of these alcohols may be used individually, or two or more of these alcohols may be used together.

The amount of the wax agent in the composition for a foam sheet is preferably 0.5 parts by mass or more, more preferably 1 part by mass or more, even more preferably 1.5 parts by mass or more, and further preferably 3.6 parts by mass or more per 100 parts by mass of the previously described polymer, and is preferably 10 parts by mass or less, more preferably 7 parts by mass or less, and even more preferably 5 parts by mass or less per 100 parts by mass of the previously described polymer. When the amount of the wax agent is parts by mass or more per 100 parts by mass of the polymer, post-heating and pressing air releasability of a laminate sheet can be further increased. On the other hand, when the amount of the wax agent is 10 parts by mass or less per 100 parts by mass of the polymer, good self-adhesive strength can be imparted to an obtained laminate sheet, and post-heating and pressing air releasability of the laminate sheet can be further increased.

The amount of a fatty acid ester including a fatty acid moiety having a carbon number of not less than 16 and not more than 34 in the composition for a foam sheet is preferably 0.5 parts by mass or more, more preferably 1 part by mass or more, and even more preferably 1.5 parts by mass or more per 100 parts by mass of the previously described polymer, and is preferably 10 parts by mass or less, more preferably 7 parts by mass or less, and even more preferably parts by mass or less per 100 parts by mass of the previously described polymer. When the amount of the fatty acid ester including a fatty acid moiety having a carbon number of not less than 16 and not more than 34 is 0.5 parts by mass or more per 100 parts by mass of the polymer, post-heating and pressing air releasability of a laminate sheet can be further increased. On the other hand, when the amount of the fatty acid ester including a fatty acid moiety having a carbon number of not less than 16 and not more than 34 is 10 parts by mass or less per 100 parts by mass of the polymer, good self-adhesive strength can be imparted to an obtained laminate sheet, and post-heating and pressing air releasability of the laminate sheet can be further increased.

<Solvent>

The solvent that may optionally be contained in the presently disclosed composition for a foam sheet is not specifically limited but is preferably water. In a case in which water is used as the solvent, water originating from a polymer latex can, for example, serve as the water that is contained in the composition for a foam sheet.

<Other Additives>

The presently disclosed composition for a foam sheet can optionally contain various additives in order to improve processability in production steps of a foam sheet and a laminate sheet and/or in order to improve performance of the obtained foam sheet and laminate sheet. Examples of such additives include foam stabilizers such as higher fatty acid salts and surfactants, auxiliary foaming agents, thickeners, fillers, antiseptics, fungicides, gelling agents, flame retardants, anti-aging agents, antioxidants, pigments, dyes, tackifiers, conductive compounds, water-resistant agents, and oil-resistant agents. Specific examples of the other additives described above include known additives such as those described in WO2016/147679A1, for example, without any specific limitations.

(Self-Suction Adhering Foam Laminate Sheet)

The presently disclosed laminate sheet is a sheet that includes a foam layer formed of a foam sheet obtained using the presently disclosed composition for a foam sheet set forth above and a substrate as a support layer supporting the foam layer. Note that the foam sheet may be formed directly on the substrate or may be formed on the substrate with any layer interposed in-between.

<Self-Suction Adhering Foam Sheet>

A self-suction adhering foam sheet that forms the foam layer of the presently disclosed laminate sheet is formed through cross-linking and foaming of the presently disclosed composition for a foam sheet.

The density of the self-suction adhering foam sheet is not specifically limited but is preferably 0.1 g/cm$^3$ or more, more preferably 0.3 g/cm$^3$ or more, and even more preferably 0.5 g/cm$^3$ or more, and is preferably 1.0 g/cm$^3$ or less, more preferably 0.8 g/cm$^3$ or less, and even more preferably 0.7 g/cm$^3$ or less. A foam sheet density of 0.1 g/cm$^3$ or more ensures strength of the foam sheet, whereas a foam sheet density of 1.0 g/cm$^3$ or less can further increase post-heating and pressing air releasability of the laminate sheet while also sufficiently inhibiting formation of resin residue on an adherend.

Note that the density of a foam sheet can be calculated using a method described in the EXAMPLES section of the present specification.

The thickness of the foam sheet is preferably 0.03 mm or more, more preferably 0.05 mm or more, and even more preferably 0.1 mm or more, and is preferably 3 mm or less, more preferably 1 mm or less, even more preferably 0.5 mm or less, and particularly preferably 0.2 mm or less. When the thickness of the foam sheet is 0.03 mm or more, mechanical strength of the foam sheet and the laminate sheet can be sufficiently ensured. On the other hand, when the thickness of the foam sheet is 3 mm or less, post-heating and pressing air releasability of the laminate sheet can be further increased. It is also possible to obtain a laminate sheet having excellent repeated affixing capability (rework performance).

<Substrate>

The substrate in the presently disclosed laminate sheet can be a paper substrate other than a synthetic paper substrate, a plastic substrate, a fibrous substrate, a metal substrate, or a glass substrate.

The thickness of the substrate is not specifically limited and can be not less than 10 μm and not more than 200 μm, for example.

<<Paper Substrate>>

The paper substrate is not specifically limited so long as it is not a synthetic paper substrate and may, for example, be woodfree paper, art paper, coated paper, kraft paper, or laminated paper obtained by laminating a thermoplastic resin such as polyethylene on any of these paper substrates.

<<Plastic Substrate>>

The plastic substrate may, for example, be a sheet-shaped substrate formed of a polyester resin such as polyethylene terephthalate or polyethylene naphthalate; a polystyrene resin; a polyvinyl chloride resin; an acrylic resin; a polycarbonate resin; a polyamide resin; a fluororesin such as polytetrafluoroethylene; or a mixture or laminate of any of these resins.

<<Fibrous Substrate>>

The fibrous substrate may, for example, be a sheet-shaped substrate formed of natural fiber such as cotton or silk; polyamide synthetic fiber; polyester synthetic fiber; polypropylene synthetic fiber; polyvinyl chloride synthetic fiber; polyvinyl alcohol synthetic fiber; semi-synthetic fiber such as acetate fiber; regenerated artificial fiber such as rayon; or a mixture or laminate of any of these fibers.

<<Metal Substrate>>

The metal substrate is not specifically limited and may, for example, be a sheet-shaped substrate formed of a metal such as iron, copper, aluminum, gold, platinum, or silver; or an alloy or laminate of any of these metals.

<<Glass Substrate>>

The glass substrate is not specifically limited and may be a sheet-shaped substrate having soda lime glass, borosilicate glass, alkali-free glass, quartz glass, or the like as a material.

<Production Method of Self-Suction Adhering Foam Laminate Sheet>

The following describes one example of a method of producing the presently disclosed laminate sheet.

FIG. 1 illustrates a flowchart for description of one example of a method S10 of producing the laminate sheet (hereinafter, also referred to simply as "production method S10"). As illustrated in FIG. 1, the production method S10 includes a composition production step S1, a foaming step S2, and a sheet forming step S3 in this order. These steps are described below.

<<Composition Production Step S1>>

The composition production step S1 is a step of producing the composition for a self-suction adhering foam sheet.

More specifically, the composition for a foam sheet can be produced in the composition production step S1 by mixing the polymer, the oxazoline cross-linker, and the wax agent that are essential components with a solvent and other additives that are used as desired by any mixing method.

For example, in a case in which a polymer latex is used in production of the composition for a foam sheet, the oxazoline cross-linker, the wax agent, and other additives that are optionally used may be added to the polymer latex and then mixed therewith by a known method.

Note that in a case in which a solid polymer is used and a solvent is not used in production of the composition for a foam sheet, the solid polymer, the oxazoline cross-linker, the wax agent, and other additives that are optionally used may be mixed by a known method (for example, using a known roll, Henschel mixer, kneader, or the like).

The viscosity of a composition for a foam sheet that contains a solvent (for example, taking the form of an emulsion or a dispersion) is preferably 1,000 mPa·s or more, more preferably 2,000 mPa·s or more, and even more preferably 3,500 mPa·s or more, and is preferably mPa·s or less, more preferably 10,000 mPa·s or less, and even more preferably 5,500 mPa·s or less. When the viscosity of the composition for a foam sheet is 1,000 mPa·s or more, it is possible to prevent liquid dripping from occurring and thickness control from becoming difficult when a foam formed from the composition for a foam sheet is coated onto a substrate and a foam sheet is formed. On the other hand, when the viscosity of the composition for a foam sheet is 10,000 mPa·s or less, it does not become difficult to control the foaming ratio through mechanical foaming during formation of the foam sheet.

Note that the viscosity of a composition for a foam sheet can be measured by a method described in the EXAMPLES section of the present specification.

<<Foaming Step S2>>

The foaming step S2 is a step of foaming the composition for a foam sheet to obtain a foam of the composition for a foam sheet.

More specifically, a foam in an unsolidified (uncross-linked) state can be obtained in the foaming step S2 by foaming the composition for a foam sheet that has been produced in the composition production step S1. In a case in which the composition for a foam sheet is in the form of an emulsion or a dispersion, a foam emulsion or a foam dispersion is obtained.

Mechanical foaming is typically adopted as the method of foaming. The foaming ratio is adjusted as appropriate and is normally 1.2 times or more, and preferably 1.5 times or more, and is normally times or less, and preferably 4 times or less. The method of mechanical foaming is not specifically limited. For example, mechanical foaming can be carried out by mixing a certain amount of air into an emulsion or dispersion of the composition for a foam sheet and stirring the mixture in a continuous or batch manner using an Oakes mixer, a whipper, or the like. The resultant foam emulsion or foam dispersion is creamy.

The formation of fine pores through this mechanical foaming makes it possible to obtain a foam sheet having excellent air releasability through the subsequently described sheet forming step S3. Note that reduction of air releasability can be prevented through the foaming ratio being 1.2 times or more, whereas reduction of strength of the foam sheet can be prevented through the foaming ratio being 5 times or less.

<<Sheet Forming Step S3>>

The sheet forming step S3 is a step of shaping the foam into the form of a sheet and subsequently performing a cross-linking reaction of the foam to produce a foam sheet.

No specific limitations are placed on the method by which the foam produced in the foaming step S2 is shaped into the form of a sheet in the sheet forming step S3. One example of a suitable method is a method in which the foam is coated onto a desired substrate and is shaped into the form of a sheet. By coating the foam onto a desired substrate in this manner and causing a cross-linking reaction to proceed, it is possible to obtain a laminate sheet in which a foam sheet is directly disposed on a substrate.

Note that coating of the foam can be performed onto a releasable sheet (process paper that is releasable, etc.) instead of the substrate. By coating the foam onto a releasable sheet and causing a cross-linking reaction to proceed, it is possible to obtain a laminate in which a foam sheet is directly disposed on a releasable sheet. The releasable sheet can then be peeled from the foam sheet of the laminate so as to obtain just the foam sheet (as an independent film).

The method by which the foam is coated onto the substrate or releasable sheet (hereinafter, also referred to collectively as the "substrate or the like") can be a method using a generally known coating device such as an applicator, a bar coater, a roll coater, a reverse roll coater, a screen coater, a doctor knife coater, or a comma knife coater.

The method by which the foam coated as a sheet onto the substrate or the like is cross-linked is preferably a method in which the foam is dried under heating. The method of drying under heating is not specifically limited so long as it is a method that enables drying and cross-linking of the foam that has been coated onto the substrate or the like, and may be a method using a known drying furnace (for example, a hot air circulation oven, a hot oil circulation hot air chamber, or a far infrared heater chamber). The drying temperature can be not lower than 60° C. and not higher than 180° C., for example. Rather than performing drying at a constant temperature, it is preferable to perform multi-stage drying such that the foam is initially dried from the inside at a low temperature and is later dried sufficiently at a higher temperature.

Note that properties of the foam sheet (density, thickness, hardness, etc.) can be adjusted by, for example, altering the mixing ratio of air bubbles and the chemical composition, solid content concentration, and drying and cross-linking conditions of the composition for a foam sheet.

The laminate sheet obtained through steps S1 to S3 described above may, for example, have a separator film affixed to a self-suction adhering surface thereof (i.e., the surface at the foam sheet-side) and may subsequently be wound up by a winding machine and then processed to an easy to use size through cutting by press-cutting, slitting, or the like, but this is not a specific limitation.

<Application of Laminate Sheet>

The substrate surface of the presently disclosed laminate sheet can be subjected to printing by offset printing, seal printing, flexographic printing, silkscreen printing, gravure printing, printing with a laser printer, thermal transfer printer, or inkjet printer, or the like.

The laminate sheet that has undergone printing at the substrate surface thereof can advantageously be used, for example, in outdoor applications such as for sales promotion cards, so-called "POP cards" (posters, stickers, displays, etc.), horticultural POPs (insertion labels, etc.), road signs (for funerals, housing exhibitions, etc.), and display boards (indicating that entry is not permitted, that work is being carried out on forest roads, etc.).

EXAMPLES

The following provides a more detailed description of the present disclosure through examples. However, the present disclosure is not limited to these examples. Note that "parts" and "%" expressing amounts in the following description are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. In each example or comparative example, the following methods were used to evaluate the glass-transition temperature and gel fraction of a polymer, the viscosity of a composition for a foam sheet, the density of a foam sheet, and the air releasability (initial and post-heating and pressing) and self-adhesive strength (initial and after time elapses) of a laminate sheet.

<Glass-Transition Temperature of Polymer>

The glass-transition temperature (Tg) of a polymer used as a material of a self-suction adhering foam laminate sheet was measured by the following method. A polymer latex containing the polymer was applied onto a polyethylene terephthalate film of 50 μm in thickness by a 250 μm applicator and was dried at normal temperature for 24 hours to obtain a film formed on the polyethylene terephthalate film. The film formed on the polyethylene terephthalate film (i.e., excluding the polyethylene terephthalate film) was used as a sample to perform measurement of glass-transition temperature (° C.) in accordance with JIS K 7121 under conditions of a measurement temperature of −50° C. to 160° C. and a heating rate of 10° C./min using a differential scanning calorimeter (DSC7000X produced by Hitachi High-Tech Science Corporation).

<Gel Fraction of Polymer>

The gel fraction of a polymer used in a laminate sheet was measured by the following method. The polymer was applied onto a polyethylene terephthalate (PET) film of 50 μm in thickness by a 250 μm applicator and was dried at normal temperature for 24 hours to obtain a resin film. This film was used as a sample. A specific amount (X) (approximately 500 mg) of the sample was precisely weighed and was then immersed in 100 mL of ethyl acetate at normal temperature for 3 days. Thereafter, insoluble matter was filtered off using a 200-mesh screen, was air dried at normal temperature for 15 hours, and was subsequently dried at 100° C. for 2 hours. After cooling at normal temperature, the weight (Y) of the sample was measured. The gel fraction was calculated by substituting X and Y into the following equation.

$$\text{Gel fraction }(\%)=(Y)/(X)\times 100$$

<Viscosity of Composition for Foam Sheet>

The viscosity of a composition for a foam sheet at 23° C. was measured using a B-type viscometer (VISCOTESTER VT-06 produced by RION Co., Ltd.).

<Density of Foam Sheet>

After a laminate sheet had been produced, the sheet was cut out as 20 cm×20 cm in size to prepare a test specimen. The mass X g of the cut-out test specimen was precisely weighed. In addition, the mass Y g of a substrate cut out as 20 cm×20 cm was precisely weighed. Thereafter, the thicknesses of the produced laminate sheet and the substrate were each measured by a thickness meter, and the thickness of the substrate was subtracted from the thickness of the laminate sheet to determine the thickness T cm of a foam sheet. Note that a value for thickness was calculated through average values of measurements made at 6 points. The density of the foam sheet was then calculated by substituting the measured values for X, Y, and T into the following equation.

$$\text{Density}(\text{g/cm}^3)=(X-Y)/(T\times 20\times 20)$$

<Air Releasability>

<<Evaluation Apparatus>>

Figure 2:
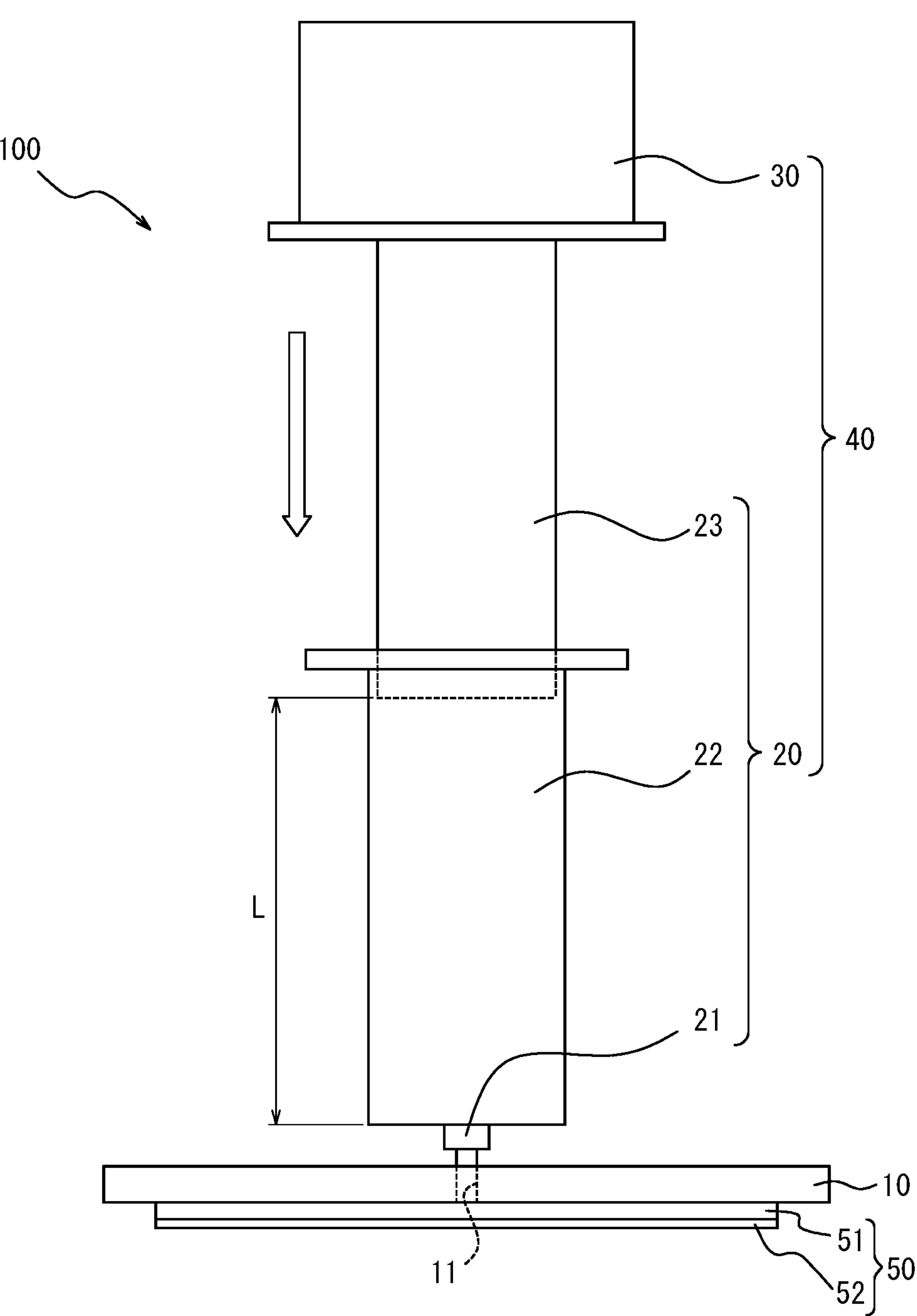
FIG. 2 is an explanatory diagram illustrating schematic configuration of an evaluation apparatus used in evaluation of air releasability of a self-suction adhering foam laminate sheet in examples and comparative examples.

Evaluation of air releasability was performed using an evaluation apparatus 100 illustrated in FIG. 2. The evaluation apparatus 100 illustrated in FIG. 2 is an apparatus that evaluates air releasability of a laminate sheet 50 in which a foam sheet 51 and a substrate 52 are stacked. The evaluation apparatus 100 includes a sample fixing plate 10 that includes a through hole 11 and a gas pumping mechanism 40 that pumps air with a constant pressure as a gas to one surface side (lower side in FIG. 2) of the sample fixing plate 10 from the other surface side (upper side in FIG. 2) of the sample fixing plate 10, via the through hole 11.

The gas pumping mechanism 40 includes a syringe 20, the front end of which is connected to the through hole 11 of the sample fixing plate 10 at the other surface side of the sample fixing plate 10, and also includes a weight 30. The syringe 20 is connected to the sample fixing plate 10 with the front end oriented in a vertically downward direction (downward in FIG. 2) and includes a needle 21 that is inserted into and fixed in the through hole 11 of the sample fixing plate 10, a circular tube-shaped barrel 22 that is connected to the through hole 11 at a front end thereof (lower end in FIG. 2) via the needle 21, and a piston 23 that is inserted into the barrel 22 from a rear end of the barrel 22.

The weight 30 is attached onto a flange disposed at a rear end (upper end in FIG. 2) of the piston 23.

In the gas pumping mechanism 40 having the configuration described above, the piston 23 is pushed into the barrel 22 under the weight of the piston 23 and the weight 30 such that air inside the barrel 22 is pumped with a constant pressure to the one surface side (foam sheet 51) of the sample fixing plate 10, via the needle 21 and the through hole 11.

Moreover, in the evaluation apparatus 100 having the configuration described above, air releasability of the laminate sheet can be evaluated by, for example, affixing the laminate sheet 50 to one surface of the sample fixing plate 10 at an opposite side thereof to the side where the needle 21 is fixed such that the laminate sheet 50 covers the through hole 11 (step (A)), subsequently connecting the barrel 22 to the needle 21 after the piston 23 with the weight 30 attached thereto has been inserted into the barrel 22 up to a position at a distance L from the front end, and then measuring the time required for the piston 23 to proceed the distance L under the weight of the piston 23 and the weight 30 (step (B)). In other words, since air inside the barrel 22 is pushed out from the through hole 11 with a constant pressure under the weight of the piston 23 and the weight 30, setting the distance L as a constant and the amount of air that is pushed out from the barrel 22 as a constant results in the time taken to proceed the distance L being longer for a laminate sheet 50 having lower air releasability and shorter for a laminate sheet 50 having higher air releasability. Accordingly, air releasability of the laminate sheet 50 can be quantitively evaluated through the time required for the piston 23 to proceed the distance L. Since evaluation can be performed under conditions in which the amount and pressure of pumped air are constant, air releasability can be evaluated with high repeatability. Moreover, since the laminate sheet 50 can be evaluated in an affixed state with the sample fixing plate 10, air releasability of the laminate sheet 50 while in an affixed state with an adherend can be accurately evaluated.

Note that a transparent polycarbonate plate (50 mm×50 mm) of 1 mm in thickness was used as the sample fixing plate 10, a glass syringe of 2 mL in capacity that included a metal syringe needle of 2 mm in diameter was used as the syringe 20, and a weight weighing 30 g was attached to the piston 23 by double-sided tape as the weight 30.

<<Evaluation of Air Releasability (Initial)>>

After a laminate sheet had been produced, the laminate sheet was cut to a size of 40 mm×40 mm to obtain a sample as an evaluation subject.

The surface at the foam sheet-side of the prepared sample was affixed to one surface of the sample fixing plate 10 at the opposite side thereof to the side where the needle 21 was fixed such as to cover the through hole 11 and such that air did not enter (step (A)). The barrel 22 was subsequently connected to the needle 21 after the piston 23 with the weight 30 attached thereto had been inserted into the barrel 22 up to a position corresponding to a marking for 2 mL. Thereafter, the weight 30 and the piston 23 that were being held by hand were released therefrom, and the time required for complete dropping of the piston 23 and the weight 30 under their own weight (i.e., until 2 mL of air was pumped) was measured (step (B)). This measurement operation was repeated three times, an average value of the measured times was calculated, and this average value was evaluated by the following standard. A smaller average value indicates that the laminate sheet has better air releasability (initial).

A: Average value for measured times of 10 seconds or less

B: Average value for measured times of more than 10 seconds and not more than 20 seconds C: Average value for measured times of more than 20 seconds and not more than 30 seconds D: Average value for measured times of more than 30 seconds <<Evaluation of Air Releasability (Post-Heating and Pressing)>>

A laminate sheet was cut to a size of 80 mm×120 mm and then left for 24 hours with 110 g/cm$^2$ of pressure applied under conditions of 60° C. and 80% RH. Thereafter, the pressure was released and the laminate sheet was left at rest under conditions of 23° C. and 50% RH for 24 hours. The laminate sheet was then further cut to a size of 40 mm×40 mm to obtain a sample serving as an evaluation subject. With the exception of the above, measurement and evaluation were performed by the same procedure as in "Evaluation of air releasability (initial)". A smaller average value indicates that the laminate sheet has better air releasability (post-heating and pressing).

<Self-Adhesive Strength>

<<Evaluation of Initial Self-Adhesive Strength>>

After a laminate sheet had been produced, the sheet was cut to a strip shape of 25 mm×125 mm to obtain a test specimen. This test specimen was affixed to a PET film serving as an adherend, and, after releasing air using a squeegee, was compression bonded by passing a 2 kgf roller back and forth once. After this compression bonding, scissors were used to remove the PET film at a section protruding from the laminate sheet, and then at least 15 hours of resting was performed in an environment of 23° C. and 50% RH to obtain a sample in which the laminate sheet and the PET film were affixed. An edge of the laminate sheet and an edge of the PET film in the sample were each gripped in a chuck of an Autograph, and then peeling was performed at a rate of 300 mm/min. The peel strength (N/cm) in this peeling was taken to be the initial self-adhesive strength of the laminate sheet to the adherend.

<<Evaluation of Self-Adhesive Strength after Time Elapses>>

After a laminate sheet had been produced, the laminate sheet was left at rest in an environment of 23° C. and 50% RH for 40 days, was then cut to a strip shape of 25 mm×125 mm to obtain a test specimen, and the test specimen was affixed to a PET film serving as an adherend. With the exception of the above, measurement was performed in the same manner as for evaluation of initial self-adhesive strength, and the peel strength (N/cm) is this measurement was taken to be the self-adhesive strength of the laminate sheet to the adherend after time elapses. A smaller difference between the initial self-adhesive strength of the laminate and the self-adhesive strength of the laminate after time elapses indicates less decline of self-adhesive strength over time.

Example 1

<Production of Polymer>

A monomer emulsion was obtained by mixing and stirring a monomer mixture containing 56 parts of ethyl acrylate, 15 parts of 2-ethylhexyl acrylate, 18 parts of n-butyl acrylate, 8 parts of acrylonitrile, 2 parts of styrene, and 1 part of acrylic acid and also 0.4 parts of sodium polyoxyethylene alkyl sulfate (LATEMUL E-118B produced by Kao Corporation) with 27.0 parts of deionized water.

Next, separately from the above, a glass reactor including a reflux condenser, a dropping funnel, a thermometer, a nitrogen blowing port, and a stirrer was prepared, this glass reactor was charged with 43.0 parts of deionized water and 0.2 parts of sodium polyoxyethylene alkyl sulfate, and these materials were heated to a temperature of 80° C. under stirring. In a state in which a temperature of 80° C. was maintained, 0.3 parts of ammonium persulfate dissolved in 5.7 parts of deionized water was added, and then the monomer emulsion obtained as described above was gradually added over 4 hours. Once this addition was complete, stirring was continued for a further 4 hours, and then cooling was performed to quench the reaction to yield a reaction mixture. The polymerization conversion rate at this point was almost 100% (98% or more). After adjusting the obtained reaction mixture to pH 5.0 with 5% ammonia water and adding 2.5 parts of polyoxyethylene lauryl ether (EMULGEN 120 produced by Kao Corporation) thereto, the reaction mixture was concentrated to yield a polymer latex having a solid content concentration of 55%. The glass-transition temperature and gel fraction of a polymer contained in the obtained polymer latex were measured. The results are shown in Table 1.

<Production of Composition for Foam Sheet>

A mixing vessel was charged with 100 parts of the polymer latex (i.e., 55 parts of the polymer contained in the polymer latex), 6 parts of an oxazoline cross-linker (EPOCROS WS-700 produced by Nippon Shokubai Co., Ltd.; oxazoline group-containing polymer; glass-transition temperature: 50° C.), 2 parts of a wax agent (including fatty acid ester having fatty acid moiety with carbon number of not less than 16 and not more than 34), and 4 parts of a foam stabilizer (ammonium stearate; Nopco DC-100A produced by San Nopco Limited) in this order. Finally, a thickener (sodium polyacrylate; ARON A-20L produced by Toagosei Co., Ltd.) was added and the viscosity was adjusted to 4,250 mPa·s to yield a composition for a foam sheet.

<Production of Laminate Sheet>

The composition for a foam sheet obtained as described above was whisked to a foaming rate of 1.6 times through stirring using a whisk and was then further stirred for 5 minutes at a reduced stirring speed.

The foamed composition for a foam sheet (foam) was coated onto a substrate (sheet-shaped substrate of 50 μm in thickness formed of polyethylene terephthalate) using a 0.3 mm applicator. The resultant product was loaded into a drying furnace and was held at 80° C. for 1.33 minutes, at 120° C. for 1.33 minutes, and at 140° C. for 1.33 minutes so as to perform drying and cross-linking to thereby obtain a laminate sheet including a foam sheet on the substrate. Note that the thickness of the foam sheet after drying was 0.140 mm. The obtained laminate sheet was used to perform various evaluations. The results are shown in Table 1.

Comparative Example 1

Production of a polymer, production of a composition for a foam sheet, and production of a laminate sheet were performed in the same way as in Example 1 with the exception that in production of the composition for a foam sheet, 3 parts of an epoxy cross-linker (RIKABOND EX-8 produced by Japan Coating Resin Co., Ltd.; fatty acid polyglycidyl ether) was added instead of 6 parts of an oxazoline cross-linker (EPOCROS WS-700 produced by Nippon Shokubai Co., Ltd.). Note that the thickness of the foam sheet after drying was 0.140 mm. The obtained laminate sheet was used to perform various evaluations. The results are shown in Table 1.

Reference Example 1

Production of a polymer, production of a composition for a foam sheet, and production of a laminate sheet were performed in the same way as in Example 1 with the exception that the chemical composition of monomers in the monomer mixture used in production of the polymer was changed from 56 parts of ethyl acrylate, 15 parts of 2-ethylhexyl acrylate, 18 parts of n-butyl acrylate, 8 parts of acrylonitrile, 2 parts of styrene, and 1 part of acrylic acid to 14 parts of methyl methacrylate, 70 parts of n-butyl acrylate, 2 parts of itaconic acid, and 14 parts of styrene, and that 3 parts of an epoxy cross-linker (RIKABOND EX-8 produced by Japan Coating Resin Co., Ltd.; fatty acid polyglycidyl ether) was added instead of 6 parts of an oxazoline cross-linker (EPOCROS WS-700 produced by Nippon Shokubai Co., Ltd.) and 2 parts of a wax agent (including fatty acid ester having fatty acid moiety with carbon number of not less than 16 and not more than 34) was not added in production of the composition for a foam sheet. Note that the thickness of the foam sheet after drying was 0.140 mm. The obtained laminate sheet was used to evaluate air releasability. The results are shown in Table 1.

In Table 1, shown below:

"EA" indicates ethyl acrylate unit;
"MMA" indicates methyl methacrylate unit;
"2EHA" indicates 2-ethylhexyl acrylate unit;
"BA" indicates n-butyl acrylate unit;
"AA" indicates acrylic acid unit;
"IA" indicates itaconic acid unit;
"AN" indicates acrylonitrile unit;
"ST" indicates styrene unit; and
"Tg" indicates glass-transition temperature.

It can be seen from Table 1 that in Example 1 in which the used composition for a foam sheet contained a polymer, an oxazoline cross-linker, and a wax agent, it was possible to form a laminate sheet having little decline of self-adhesive strength over time as compared to in Comparative Example 1 in which the used composition for a foam sheet contained a cross-linker other than an oxazoline cross-linker instead of containing an oxazoline cross-linker.

INDUSTRIAL APPLICABILITY

According to the present disclosure, it is possible to provide a self-suction adhering foam laminate sheet having little decline of self-adhesive strength over time and a composition for a self-suction adhering foam sheet that can be used to obtain this self-suction adhering foam laminate sheet.

REFERENCE SIGNS LIST

S1 composition production step
S2 foaming step
S3 sheet forming step
S10 method of producing laminate sheet
10 sample fixing plate
11 through hole
20 syringe
21 needle
22 barrel
23 piston
30 weight
40 gas pumping mechanism
50 laminate sheet
51 foam sheet
52 substrate
100 evaluation apparatus

The invention claimed is:

1. A self-suction adhering foam sheet comprising a composition, the composition comprising: a polymer, an oxazoline cross-linker, and a wax agent, wherein the polymer includes an alkenyl aromatic monomer unit in a proportion of 0.5 mass % or more and 20 mass % or less, and a gel fraction of the polymer is 95 mass % or less.

TABLE 1

| | | | | | Example 1 | Comparative Example 1 | Reference Example 1 |
|---|---|---|---|---|---|---|---|
| Composition for foam sheet | Polymer | Chemical composition | (Meth)acrylate monomer unit | EA [mass %] | 56.0 | 56.0 | — |
| | | | | MMA [mass %] | — | — | 14.0 |
| | | | | 2EHA [mass %] | 15.0 | 15.0 | — |
| | | | | BA [mass %] | 18.0 | 18.0 | 70.0 |
| | | | Unsaturated carboxylic acid monomer unit | AA [mass %] | 1.0 | 1.0 | — |
| | | | | IA [mass %] | — | — | 2.0 |
| | | | Vinyl cyanide monomer unit | AN [mass %] | 8.0 | 8.0 | — |
| | | | Alkenyl aromatic monomer unit | ST [mass %] | 2.0 | 2.0 | 14.0 |
| | | Tg [° C.] | | | −31 | −31 | −25 |
| | | Gel fraction [mass %] | | | 80 | 80 | 1 |
| | Amount per 100 parts by mass of polymer | Oxazoline cross-linker [parts by mass] | | | 10.9 | — | — |
| | | Epoxy cross-linker [parts by mass] | | | — | 5.5 | 5.5 |
| | | Wax agent [parts by mass] | | | 3.6 | 3.6 | — |
| Laminate sheet | Density of foam sheet [g/cm$^3$] | | | | 0.54 | 0.58 | 0.60 |
| | Air releasability (initial) | | | | A | A | C |
| | Air releasability (post-heating and pressing) | | | | A | A | D |
| | Self-adhesive strength (initial) [N/cm] | | | | 0.5 | 0.4 | — |
| | Self-adhesive strength (after time elapses) [N/cm] | | | | 0.3 | 0.1 | — |

2. The self-suction adhering foam sheet according to claim 1, wherein the polymer includes a (meth)acrylate monomer unit in a proportion of not less than 60 mass % and not more than 99 mass %.

3. The self-suction adhering foam sheet according to claim 1, wherein an amount of the oxazoline cross-linker is not less than 0.5 parts by mass and not more than 30 parts by mass per 100 parts by mass of the polymer.

4. The self-suction adhering foam sheet according to claim 1, wherein the wax agent includes a fatty acid ester including a fatty acid moiety having a carbon number of not less than 16 and not more than 34.

5. The self-suction adhering foam sheet according to claim 1, wherein an amount of the wax agent is not less than 0.5 parts by mass and not more than 10 parts by mass per 100 parts by mass of the polymer.

6. A self-suction adhering foam laminate sheet comprising: a substrate; and the self-suction adhering foam sheet according to claim 1, wherein the substrate is a paper substrate other than a synthetic paper substrate, a plastic substrate, a fibrous substrate, a metal substrate, or a glass substrate.

* * * * *